July 19, 1960 H. STOBBE ET AL 2,945,916
LINE IDENTIFICATION ARRANGEMENTS PARTICULARLY FOR TELEPHONE SYSTEMS
Filed Aug. 30, 1955
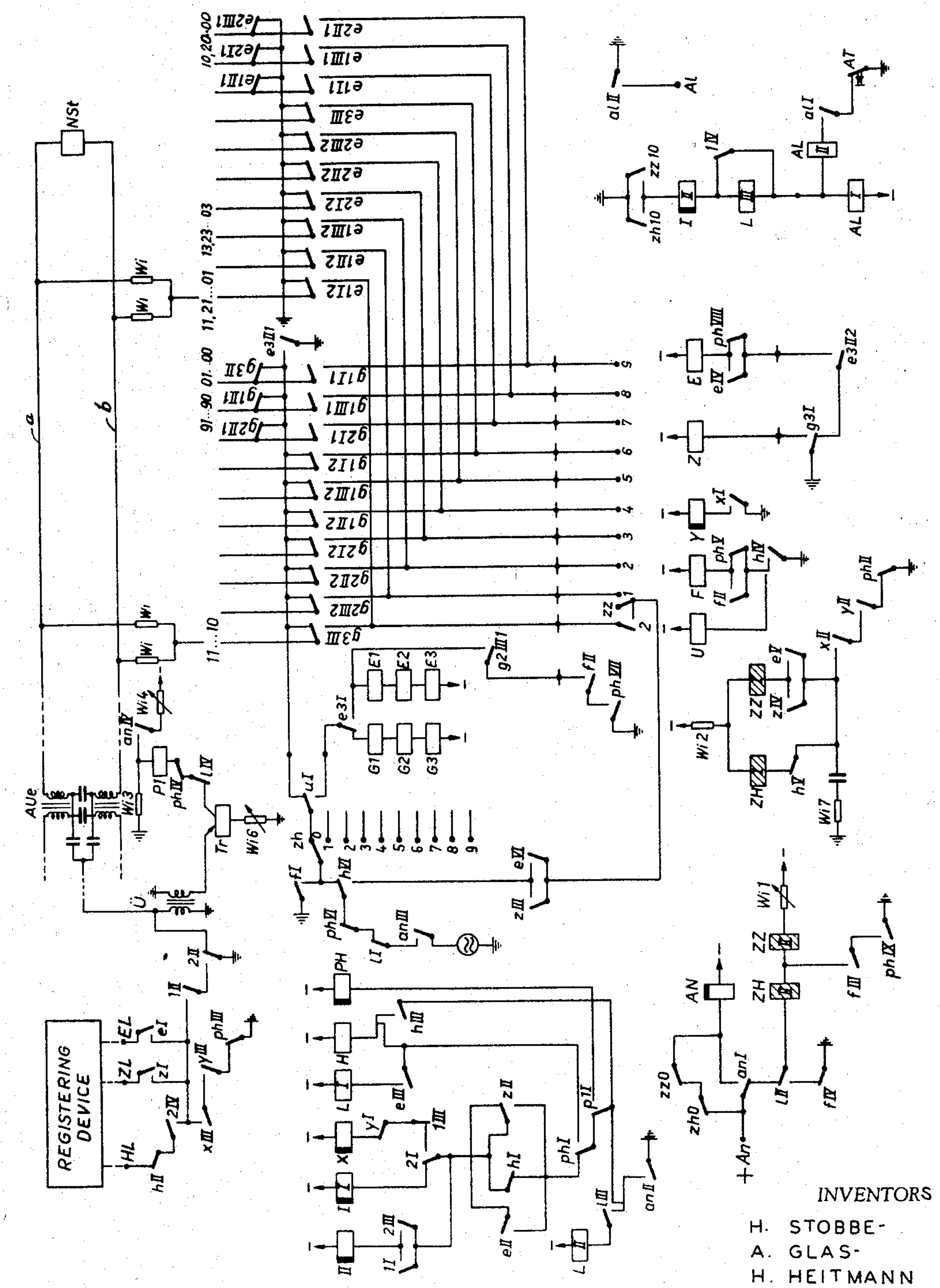
INVENTORS
H. STOBBE
A. GLAS
H. HEITMANN
BY Robert Harding Jr.
ATTORNEY United States Patent Office 2,945,916 Patented July 19, 1960

2,945,916

LINE IDENTIFICATION ARRANGEMENTS PARTICULARLY FOR TELEPHONE SYSTEMS

Helmut Stobbe, Stuttgart, and Arthur Glas and Herbert Heitmann, Stuttgart-Zuffenhausen, Germany, assignors to International Standard Electric Corporation, New York, N.Y., a corporation of Delaware Filed Aug. 30, 1955, Ser. No. 549,210

(Filed under Rule 47(a) and 35 U.S.C. 116)

Claims priority, application Germany Sept. 1, 1954

9 Claims. (Cl. 179—18)

The invention relates to a circuit arrangement for the identification of line circuits in which the lines are arranged in groups. In previously suggested circuit arrangements of this kind, there is allocated to each group a control circuit by means of which all lines of such a group are tested at the same time, and at the completion of this test there is started a finder switch allocated to the particular group for identifying a predetermined line of this group. After the finder switch has hunted for the desired line, the switch is stopped thus marking by its position the number of the identified line. When employing such an arrangement for the assessing of charges in telephone systems it is necessary to transfer the subscriber's number, which is marked by the position of the finder switch, to a storing or registering device allocated to the office repeater, in order to free the finder for performing other identifying operations. Furthermore, in these previously proposed arrangements, the alternating voltage which is used for the testing, is applied at its full value to the speaking wires whereby, on account of unbalance caused by the manufacturing tolerances of circuit components employed in the installation, this alternating voltage may become audible at the subscriber's station.

The present invention seeks to avoid the aforementioned disadvantages and permits an identification of a line with considerably less expensive switching means compared with the previously suggested arrangement.

With the arrangement of our invention there is no longer required a supplementary transmission of the identified subscriber's number to a register or other storing device. Furthermore, the invention prevents the alternating voltage which is used for testing from becoming audible at the subscriber's station. The allocation of one alternating-current circuit per assembled group is also obviated, there being employed a single control circuit for the identification.

According to the invention these objects are achieved by grouping the lines in tens groups or decades by means of a coupling and connecting the individual tens groups (decades), via switching means, to form hundreds groups, identification being effected by switching successively to differently assembled tens groups (decades). The decades, which are assembled by means of such switching means, are tested by means of a counting magnet with respect to their membership in a certain hundreds group. After the identification of this particular hundreds group, another counting magnet successively determines the membership of the line to be identified with respect to a certain tens- and unit-group. By this manner of testing it is possible, e.g. with an arrangement in which one thousand lines are to be identified and in which there were hitherto required ten selectors with one hundred outlets each, to achieve the same effect by employing only two counting magnets. According to a further feature of the invention, at each group identification the same switching means becomes effective over an alternating current control circuit and causes the testing of the next lowest-ranking group. The alternating testing current is thereby momentarily applied over the coupling and the successive steps of the counting magnets to the speaking wires of the lines. The control of the counting magnets is effected by the same relays and prior to each identification of a group the counting magnets are returned to their normal position. During the identification of a line, the information regarding the identified group is transmitted to a register or other storing device.

According to a further feature of the invention the last step of the counting magnets may be used for effecting an alarm indication in the event of a possible faulty test.

The invention will now be particularly described with reference to one embodiment shown as an example in the accompanying drawing. It is assumed that a subscriber station N*st* has seized an outgoing office repeater A*ue* in a well-known manner.

As indicated on the drawing, for the purpose of identification, the subscribers' lines are assembled in groups of ten, the talking wires of each line of a group of ten being connected via resistances W1 to a tens coupling wire such as 11 . . . 10, 91 . . . 90, 01 . . . 00, etc. The tens coupling wires of ten decades (groups of 10) are normally connected over back contacts of tens switching relays, such as G1, G2, G3, to a hundreds coupling wire. The hundreds coupling wires are respectively connected over contacts (e.g. *u*I) of a relay U to the ten contact groups of a decade counting magnet ZH. The corresponding front contacts of switching relays such as G1, G2, G3 are connected in multiple to leads connected respectively to the ten contact groups of a second decade counting magnet ZZ. These contact groups are also connected, respectively, to front contacts of units switching relays, such as, E1, E2, E3. The subscriber lines of a hundreds group having the same units digit are connected over other resistances W1 to a units coupling wire, such as 11, 21 . . . 01, 13, 23 . . . 03, etc., and the ten units coupling wires are connected to the movable contacts of the units switching relays E1, E2, E3.

A starting relay AN of the subscriber identification equipment will first be energized via: plus, point AN, back contacts *zho, zzo,* winding of relay AN, minus. The relay AN initiates the identification of that particular station which has seized the office repeater in the following manner. Since the circuit for the starting relay AN proceeds over the zero contacts *zho* and *zzo* of the counting magnets ZH and ZZ, the starting of the identification equipment is only effected in the zero position of the counting magnets. If an identification is initiated whenever the counting magnets are not in their zero position, then the two release windings ZHII and ZZII of the counting magnets will be energized over plus at point A*n*, back transfer contacts *an*I, LII, windings II of counting magnets *zh* and *zz* in series, resistance WiI, minus; whereby the counting magnets are restored to their zero position and the starting relay AN will be energized over the previously mentioned circuit and will lock up over its own contact *an*I. Contact *an*II completes a circuit for relay I over plus, front contact *an*II, 1III, back contacts *p*II, *ph*I, *h*I, 2I, winding of relay I, minus.

Decade counting magnets of the kind indicated by the references ZH, ZZ are well-known in the telephone art and are fully described in, for example, Patent No. 2,538,819.

Contact 1I completes a circuit for relay II, which remains energized over its own contact 2III and, by actuating its contact 2I, interrupts the circuit for relay I. During the release time of slow-release relay I, plus potential will be applied to the register of the office repeater via plus, front contacts 2II, 1II, 2IV, back contact *h*II, point HL whereby the equipment in the register provided for counting the hundreds digit will register one step. At the same time alternating testing current is applied over contacts *an*III via 1I, *ph*VI, hVI partial armature of the counting magnet, *u*I contacts of the relays G1, G2, G3, coupling resistance W*i* to the subscriber lines of the first hundred subscribers. Assuming a subscriber of the second hundreds group has seized the outgoing office repeated A*ue* for the first hundreds group, a test circuit will not be completed. Upon the de-energization of relay I a circuit for relay X will be completed over plus, *an*II, 1III, *p*1I, *ph*I, *h*I, 2I, 1III, *y*I, winding of relay X, minus.

Contact *x*I energizes relay Y which, with its contact *y*I, interrupts the circuit for relay X. This reciprocal interaction between relay X and relay Y will be repeated, whereby, during each release period of relay X the counting magnet ZH will be provided with a circuit over plus, *ph*II, *y*II, *x*II*h*V, winding I of counting magnet ZH, W*i*2, minus and will be advanced one step. Additionally, and at the same time, over plus, *ph*III, *y*III, *x*III, 2IV, *h*II, point HL to the register in the office repeater a stepping impulse will be given to the equipment provided for storing the hundreds digit. Since it was assumed that an extension station of the second hundreds group had seized the office repeater, there will then be completed the following control circuit: plus, A.C.-source, *an*III, 1I, *ph*VI, *h*VI, *zh*1, contacts of the relays G1, G2, G3, coupling resistances W*i*, *a*/*b*-wire leading to the office repeater, primary winding of the repeater U, plus.

By means of the repeater (transformer) U, the alternating-current, which is flowing through the testing circuit, will be transmitted to the input of a transistor T*r*, which is so connected as to be in a non-conductive bistable condition. The transistor T*r* will become conductive and energize the relay P1. By the actuation of contact p1I the circuit for the pair of stepping relays X, Y of the counting magnet ZH will be interrupted, and a circuit will be closed for relay PH which, thereupon, will be energized. Contact *ph*I energizes relay H, which remains energized over its contact *h*1II.

At contact *ph*IV the circuit for relay P1 will be opened. Relay P1 now falls off and at contact *p*1I opens the circuit for relay PH. Upon the energization of relay H the relay U becomes energized over plus, *h*IV, U, minus. Relay U, by its contacts *u*I switches over the contacts of the counting magnet ZH to circuits of relays such as G1, G2, G3 to prepare for the testing of the decade groups. Upon the release of relay PH, relay F will be energized over plus, *h*IV, *ph*V, F, minus and remain energized over its holding contact *f*II. Over plus, *f*I, the operated partial armature *zh*1, *u*, G1, G2, G3, minus, the relays G1, G2 and G3 will be energized. The contacts of these relays switch the decades of the second hundreds group to the contacts of the tens counting magnet ZZ, which is stepped on by the already described counting relay pairs I, II and X, Y, after relay Z had been energized over contact *g*3I, and at contact *z*II prepared circuits for relays I, II and X independent of contacts *h*I of relay H. Testing for the respective decade of the particular station, which has seized the office repeater now takes place. At the same time, upon the setting of the counting magnet ZZ, impulses are transmitted over contacts *z*I via the line ZL to the register of the office repeater and, in this way, there will be received the corresponding decade digit of the calling station. If, for instance, the calling station is located in the fourth decade then, on the attraction of the third partial armature of the counting magnet ZZ, the following test circuit will be completed; plus, A.-C.-source, *an*III, 1I, *ph*VI, *h*VI, *z*III, *zz*3, *g*212 coupling resistance W*i*, *a*/*b*-wire leading to the office repeater, transformer U, plus.

By means of the transformer Ü the alternating-current flowing in this test circuit will again be transmitted to the input of the transistor T*r* so that, as described already hereinbefore, relay P1 will be energized and, at its contact *p*1I, interrupt the circuit for the pair of relays X, Y, which controls the counting magnet ZZ. At the same time the relay PH will again be energized. Relays E1, E2, E3 are now operated over the circuit plus, *ph*VII, *f*II, *g*2III1, E1, E2, E3, minus. By reversing the contact *e*3I the relays G1, G2, G3 will be deenergized. By the operation of relay PH the circuit for relay P1 had been interrupted, so that at contact *p*1I the relay PH will be de-energized, and relay E will be energized over plus, *g*3I, *e*3II2, *ph*VIII, E, minus.

The alternating testing voltage will now be re-applied by the counting magnet ZZ. Prior thereto, relay PH closed a circuit from plus, *ph*IX, *f*III, ZZ(II), *wi*1, minus for the release winding ZZ(II) of the counting magnet ZZ, whereby the counting magnet ZZ itself is restored to its zero position. As already described, the pairs of relays I, II and X, Y will again be started and the counting magnet ZZ will be advanced in a step-by-step manner. At the same time, over point EL, the register in the office repeater will be controlled to record the units digit. The counting magnet ZZ thus successively applies the alternating testing current to the decades, and then identifies the units digit. As soon as the counting magnet ZZ has successfully hunted the unit digit of the calling subscriber, the A.C.-circuit will be completed over the transformer Ü as in the case of the other digits. Relay P1 will be energized and interrupts the circuit for the pairs of relays I, II and X, Y. At contact *p*1I a path is completed for the energisation of the relay PH, the contact *ph*IV of which interrupts the circuit for relay P1 which, consequently, will drop off and interrupt the circuit of relay PH, the latter then dropping off with a time-delay. During the time in which relay P1 releases and relay PH is still energized, the relay L is energized over plus, *an*II, 1III, *p*1I, *ph*I, *e*III, winding of relays L, minus. Relay L holds over its contact 1III. Relay L indicates the completion of the subscriber identification and the counting magnets ZH and ZZ are restored to their zero position over plus, *f*IV, 1II, ZH(II), ZZ(II), W*i*1, minus. Thus the subscriber has been identified and the substation number recorded in the office register.

If for any reason, during the hunting of the calling station the alternating current control circuit is prevented from being completed, or if the relay P1, which serves to prevent the counting magnets from being stepped on by the pair of relays X, Y, does not pull up, then a counting magnet ZH or ZZ will be stepped through to the last partial armature, thereby energizing the relays I and AL by the action of the last contact of the partial armature ZZ10 or ZH10 respectively. By the energization of relay AL a signal may be transmitted in any well-known manner to an operator's position for the purpose of indicating a faulty identification. By the energization of relay I the contact 1IV opens the short-circuit for the winding III of relay L which, accordingly, pulls up and indicates the end of the subscriber identification process, i.e., the counting magnets ZH and ZZ are restored to their zero position. The identification may then be started again.

While we have described above the principles of our invention in connection with specific apparatus, it is to be clearly understood that this description is made only by way of example and not as a limitation to the scope of our invention.

What we claim is:

1. Line identification arrangements for telephone exchange and like systems, wherein the subscriber lines are assembled in groups of ten, each ten of said tens groups being assembled to form a hundreds group, comprising a tens coupling wire for each tens group, a hundreds coupling wire for each hundreds group, a first decade counting device, a second decade counting device, a source of test potential, test means at said exchange for responding to said test potential, first means including said first decade counting device for connecting said source of test potential successively to said hundreds coupling wires, registering means for said hundreds groups, means controlled by said first source-connecting means for operating said hundreds registering means at each successive connection of said source to said hundreds coupling wires, switch means intermediate said test means and said hundreds coupling wires for connecting said hundreds coupling wires to said test means when in a first position, means responsive to the response of said test means for causing said switch means to shift to a second position, second means including said second decade counting device for thereafter connecting said source of test potential successively to said tens coupling wires, registering means for said tens groups, means controlled by said second source-connecting means for operating said tens registering means at each successive connection of said source to said tens coupling device, said switch means connecting said tens coupling wires to said test means when in said second position, whereby said test means at said exchange responds to said potentials as such potential is detected in each line group, and the numbers of said line groups are registered.

2. Line identification arrangement, according to claim 1, wherein said subscriber lines are also assembled in units groups, comprising a units coupling wire for each units group, means including said second decade counting device for connecting said source of test potential successively to said units coupling wires after the tens groups have been tested by the test means, registering means for said units groups, and means controlled by said last-mentioned means for operating said units registering means at each successive connection of said source to said units coupling wires.

3. Line identification arrangement, according to claim 1, wherein said test means comprises relay means which is used for both said hundreds group and tens group identification.

4. Line identification arrangement according to claim 1 further comprising common stepping relay means for said first and second decade counting devices, and means responsive to said stepping relay means for successively advancing said decade counting devices to test first for a hundreds line group and then for a tens line group.

5. Line identification arrangement, according to claim 4, wherein said source of test potential comprises a source of alternating current and comprising relay means for momentarily connecting said source to said hundreds coupling wires and said tens coupling wires over the stepping positions of said decade counting devices during the release time of said relay means.

6. Line identification arrangement, according to claim 1, wherein the coupling wire of the first hundreds group is connected to the normal stepping position of said first decade counting device and the coupling wire of the first tens group is connected to the normal stepping position of said second decade counting device, and comprising relay stepping means for advancing said first and second decade counting devices after said first hundreds and first tens groups have been respectively tested.

7. Line identification arrangement, according to claim 6, further comprising a fault alarm relay connected to the last stepping position of said first and second decade counting devices.

8. Line identification arrangement, according to claim 6, further comprising means for restoring said first and second decade counting devices to their normal position before they are actuated to make a new identification test.

9. Line identification arrangement for telephone exchange and like systems wherein the subscriber's lines are assembled in tens and units groups, comprising a tens coupling wire for each tens group, a units coupling wire for each units group, a decade counting device, a source of test potential, means including said decade counting device for connecting said source of test potential successively to said tens coupling wires, test means for responding to said test potential to identify a particular tens group, switching means responsive to the actuation of said test means for disassociating said decade counting device from said tens coupling wires and associating it with said units coupling wires, means for thereafter again actuating said decade counting device to connect said source of test potential successively to said units coupling wires to identify a particular units coupling wire, tens registering means, units registering means, means for operating said tens registering means for each successive operation of said decade counting device in connecting said source of test potential to successive tens coupling wires, and means for operating said units registering device for each successive operation of said decade counting device in connecting said source of test potential to successive units coupling wires.

References Cited in the file of this patent

UNITED STATES PATENTS

| | | |
|---|---|---|
| 2,603,712 | Ostline | July 15, 1952 |
| 2,603,713 | Ostline | July 15, 1952 |
| 2,621,256 | Stehlik | Dec. 9, 1952 |
| 2,705,743 | Klinkhammer | Apr. 5, 1955 |